United States Patent [19]
Kwon

[11] Patent Number: 5,997,423
[45] Date of Patent: Dec. 7, 1999

[54] APPARATUS FOR CONTROLLING CHAIN TENSION

[75] Inventor: Yi Sug Kwon, Changwon, Rep. of Korea

[73] Assignee: LG Industrial Systems Co., Ltd., Seoul, Rep. of Korea

[21] Appl. No.: 08/974,314

[22] Filed: Nov. 19, 1997

[30] Foreign Application Priority Data

Nov. 20, 1996 [KR] Rep. of Korea ............. 96/55623
Nov. 20, 1996 [KR] Rep. of Korea ............. 96/55625

[51] Int. Cl.$^6$ ............. F16H 7/22; B65G 47/10
[52] U.S. Cl. ............. 474/103; 198/810.4
[58] Field of Search ............. 474/101, 102, 474/103, 142, 3, 70; 198/810.04

[56] References Cited

U.S. PATENT DOCUMENTS

| | | | |
|---|---|---|---|
| 3,179,240 | 4/1965 | Kain | 474/142 X |
| 3,208,296 | 9/1965 | Baermann | 474/142 |
| 4,372,172 | 2/1983 | Gombocz et al. | 198/810.04 X |
| 4,557,372 | 12/1985 | Rajagopal | 474/103 X |
| 4,657,131 | 4/1987 | Brychta et al. | 198/810.04 |
| 5,002,177 | 3/1991 | Winning | 198/810.04 |
| 5,752,897 | 5/1998 | Skowrinski et al. | 474/101 X |

*Primary Examiner*—Thomas R. Hannon
*Assistant Examiner*—Brandon C. Stallman

[57] ABSTRACT

A chain tension control apparatus for preventing a chain chattering in a power transmission system including main and subordinate sprockets and a chain connecting the main and subordinates sprockets. The apparatus maintains a chain tension by sensing a chain release and accordingly driving an electromagnet in accordance with a compensation signal that responds to chain release factors, and the chain tension in the apparatus is maintained by disposing a permanent magnet adjacent to the chain, thereby preventing chain vibration and noise from occurring.

8 Claims, 6 Drawing Sheets

APPARATUS FOR CONTROLLING CHAIN TENSION

BACKGROUND OF THE INVENTION

1. Field of the Invention

The present invention relates to a chain-drive power transmission apparatus, and more particularly to an improved chain tension control apparatus for preventing chain chattering in a chain-drive power transmission system, which is capable of preventing a chain from generating a vibration noise by appropriately maintaining a chain tension thereof.

2. Description of the Background Art

In general, a chain-drive power transmission system employing a pair of sprockets driven by a chain which is engaged thereonto is widely applied to a variety of industrial appliances, such as transportation vehicles.

Conventionally, as shown in FIG. 1, a chain-drive power transmission apparatus includes main and free wheeled subordinate sprockets $1a$, $1b$, and a chain 2 engaged onto the main and free wheeled subordinate sprockets $1a$, $1b$ for power transmission. Here, reference numeral 3 denotes chain rollers.

The chain 2 is formed by serially engaging a plurality of steel link plates into one another, and it is generally classified into a roller chain and a silent chain.

The silent chain is adopted to obtain a smooth and silent operation but is complicated in structure, so that it is only employed in limited fields due to its high production cost. Consequently, the roller chain is broadly employed.

However, although it is an advantage in that a larger amount of power may be transmitted at a constant rate, the conventional power transmission apparatus using a roller chain tends to generate vibration or noise due to its structural disadvantages.

Such vibration and noise are generated as a result of metal-to-metal friction. In particular, external and internal factors may produce errors in straightness, alignment and pitch with regard to the sprockets $1a$, $1b$. Further, a long-term operation and subsequent wear of the sprockets $1a$, $1b$ may cause a connection problem between the sprockets $1a$, $1b$ and the chain 2, thereby increasing the noise.

For instance, as shown in FIG. 2, a chain roller 3 during the operation of chain 2 tends to incline towards a side wall "B" rather than towards a bottom center "A" of a U-shaped groove 4 that receives and passes the roller 3, thereby producing a further noise.

Moreover, a main reason for the noise generation in the chain-drive power transmission apparatus is attributable to a decreased tension in the chain 2. That is, when the chain 2 is loosened by the decreased tension therein, an impact between the respective sprockets $1a$, $1b$ and the chain 2 causes a serious chain chattering noise which results from the chain 2 vibration.

Here, a variety of methods are being considered in order to restrain noise generation. As an example, a buffer is supplied in the U-shaped groove 4 in order to decrease the noise that may be caused by friction between the chain rollers 3 and the main and free wheeled subordinate sprockets $1a$, $1b$. As another example, a chain guide shoe is fixedly provided between the main and free wheeled subordinate sprockets $1a$, $1b$ and the chain 2, for thereby decreasing vibration noise that may be caused by decreased tension of the chain 2.

However, the buffer installation in the U-shaped grooves 4 of the main and free wheeled subordinate sprockets $1a$, $1b$ is complicated, and easily generates an abrasion thereof. Also, the chain guide shoe installation leads to an impact noise between the chain guide shoe and the chain 2.

SUMMARY OF THE INVENTION

Accordingly, it is an object of the present invention to provide a chain tension control apparatus for preventing a chain chattering in a chain-drive power transmission system, capable of effectively decreasing vibration noise that occurs due to the chain by appropriately maintaining a chain tension by use of a magnetic force.

To achieve the above-described object, in a power transmission system including main and free wheeled subordinate sprockets and a chain formed of a plurality of links and rollers connected to each other, wherein the chain meshed to the main sprocket and the free wheeled subordinate sprocket transfers a rotation force of the main sprocket to the free wheeled subordinate sprocket, a chain tension control apparatus includes a first chain release detecting sensor disposed adjacent to a central upper portion of an upper span of the chain and detecting a release of the upper span of the chain, a second chain release detecting sensor disposed adjacent to a central lower portion of a lower span of the chain and detecting a release of the lower span of the chain, a tension controller comparing respective signal values outputted from the first and second chain release detecting sensors with a reference value, and outputting first and second compensation signals for compensating each release of the upper span and lower span of the chain, a first electromagnet disposed adjacent to a central lower portion of the upper span of the chain, and downwardly attracting the upper span of the chain in accordance with the first compensation signal outputted from the tension controller, and a second electromagnet disposed adjacent to a central upper portion of the lower span of the chain, and upwardly attracting the lower span of the chain in accordance with the second compensation signal outputted from the tension controller.

Further, to achieve the above-described object, in a power transmission system including main and free wheeled subordinate sprockets and a chain formed of a plurality of links and rollers connected to each other, wherein the chain meshed to the main sprocket and the free wheeled subordinate sprocket transfers a rotation force of the main sprocket to the free wheeled subordinate sprocket, a chain tension control apparatus according to the present invention includes a first chain release detecting sensor disposed adjacent to a central upper portion of an upper span of the chain and detecting a release of the upper span of the chain, a second chain release detecting sensor disposed adjacent to a central lower portion of a lower span of the chain and detecting a release of the lower span of the chain, first and second A/D (Analog/Digital) converters correspondingly converting respective signal values outputted from the first and second chain release detecting sensors to digital signal values, a tension controller outputting first and second compensation signals for compensating a chain release of each of the upper and lower spans of the chain in correspondence with respective signal values outputted from the first and second A/D converters, first and second D/A (Digital/Analog) converters correspondingly converting the first and second compensation signals outputted from the tension controller to analog signals, first to fourth diodes rectifying positive and negative polarities of respective signal values outputted from the first and second D/A converters, first and second electromagnets disposed adjacent to a central lower portion of the upper span and to a central upper portion of the lower span of the chain, and downwardly attracting the upper span of the chain in accordance with respective signal values outputted from the first and second diodes, and third and fourth electromagnets disposed adjacent to a central lower portion of the upper span and to a central upper portion of the lower span of the chain, and upwardly attracting the lower span of the chain in accordance with respective signal values outputted from the third and fourth diodes.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
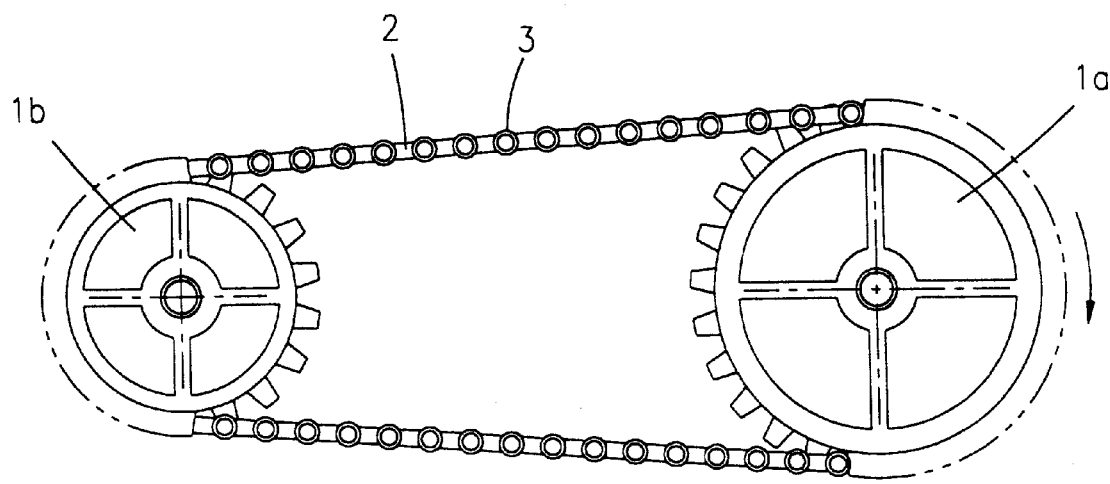
FIG. 1 is a schematic side view of a general power transmission apparatus using a chain drive.
Figure 2:
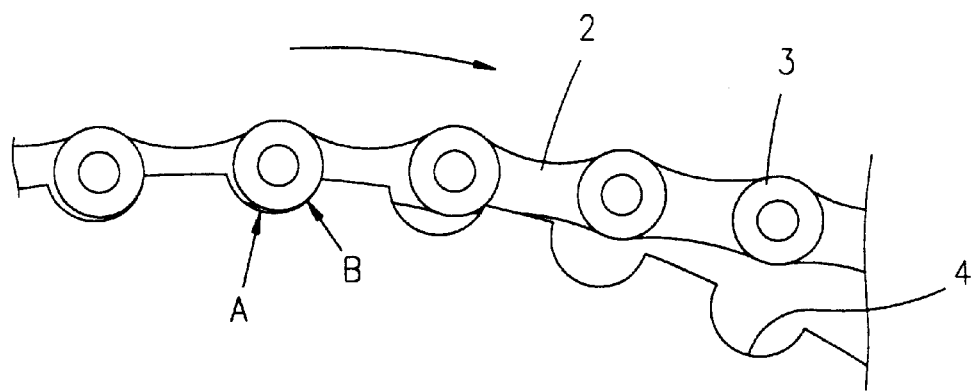
FIG. 2 is a partial view detailing the interaction between a sprocket and chain rollers in the side view of FIG. 1.
Figure 3:
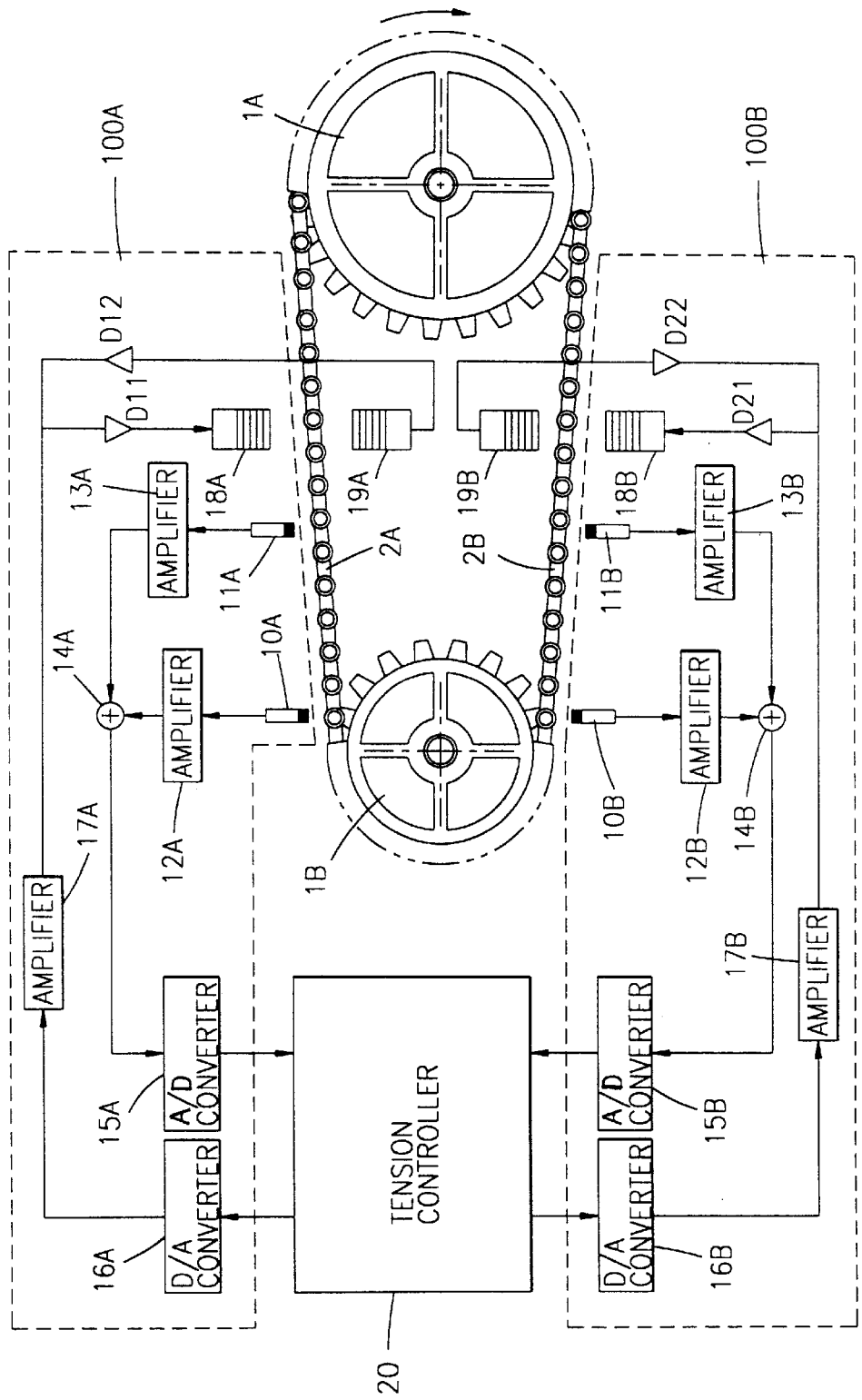
FIG. 3 is a block diagram illustrating a chain tension control apparatus in a chain-drive power transmission system according to a first embodiment of the present invention.

As shown in FIG. 3 illustrating an apparatus for preventing a chain chattering in a chain-drive power transmission system according to a first embodiment of the present invention, the apparatus includes a first tension control block 100A for compensating the release of a chain that travels along an upper span of the chain while maintaining a required chain tension therein, and a second tension control block 100B for compensating the release of a chain that travels along a lower span of a chain while maintaining a required chain tension therein.

The first tension control block 100A includes: a chain release detecting sensor 10A disposed adjacent to a main sprocket 1a or of a free wheeled subordinate sprocket 1b which is being meshed to an upper span 2A of a chain 2 thereat, and detecting the chain release of the upper span 2A of the chain 2; an amplifier 12A amplifying an output signal from the chain release detecting sensor 10A; a chain release detecting sensor 11A disposed adjacent to a central portion of the upper span 2A and detecting the chain release of the upper span 2A; an amplifier 13A amplifying an output signal from the chain release detecting sensor 11A; a subtractor 14A offsetting respective signals outputted from the amplifiers 12A, 13A; an A/D (Analog/Digital) converter 15A converting an analog signal outputted from the subtractor 14A to a digital signal; a tension controller 20 comparing the signal value outputted from the A/D converter 15A with a reference value, and outputting a chain release compensating signal; a D/A converter 16A converting to an analog signal the compensating signal outputted from the tension controller 20; an amplifier 17A amplifying an output signal from the D/A converter 16A; a pair of diodes D11, D12 rectifying the output signal from the amplifier 17A to a positive and negative sinusoidal signals; and a pair of electromagnets 18A, 19A disposed at an upper and lower central portions of the upper span 2A and spaced by a predetermined distance from each other, thereby generating a magnetic force for downwardly attracting the upper span 2A of the chain 2 in accordance with the output values from the diodes D11, D12.

Here, under the corresponding reference numerals, the constitution of the second tension control block 100B is identical to that of the first tension control block unit 100A.

Figure 7:
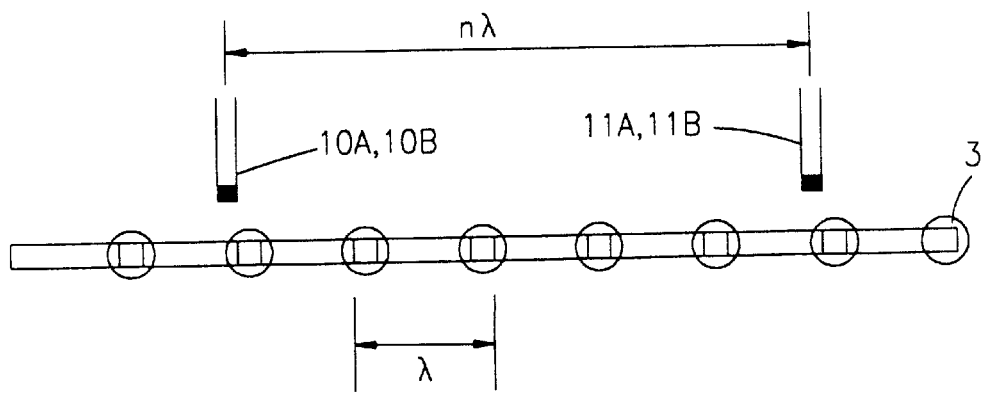
FIG. 7 is a view illustrating chain release detecting sensors in the diagram of FIG. 3.

As shown in FIG. 7, the respective chain release detecting sensor 10A, 10B, 11A, 11b are spaced from each other by an integer n times a length λ (nλ) where λ denotes a measurement between two adjacent chain rollers, so that the subtractor 14A may accurately detect the vibration factors of the chain 2.

The chain release detecting sensor 10A, 11A respectively employ a near-by sensor which detects a further released chain than a predetermined value, or an ultrasonic sensor which generates an output value which is proportional to the chain release.

Figure 4:
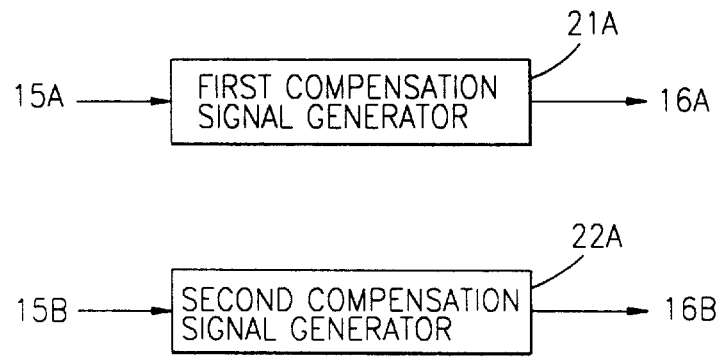
FIG. 4 is a block diagram illustrating a first example of a tension controller in the diagram of FIG. 3.

The tension controller 20 as shown in FIG. 4 includes a first compensation signal generator 21 outputting a first compensation signal in correspondence with the output value from the A/D converter 15A, and a second compensation signal generator 22 outputting a second compensation signal in correspondence with the output value from the A/D converter 15A.

The operation of the thusly constituted vibration preventing apparatus for a chain-drive system according to the present invention will now be described.

First, when the free wheeled subordinate sprocket 1b engaged by the chain 2 is driven in accordance with the driving of the main sprocket 1a, the chain 2 generates a chain chattering noise caused by a tension scarcity therein.

The chain release detecting sensor 10A fixedly disposed adjacent to an upper portion of the subordinate sprocket 1b, and the chain release detecting sensor 11A fixedly disposed adjacent to a central upper portion of the upper span 2A of the chain 2 are directed to detect an upward release of the chain and converts the detected value to an electrical signal which is in turn amplified in the respective amplifiers 12A, 13A. The amplified signals are applied to the subtractor 14A.

At this time, as shown in FIG. 7, the chain release detecting sensor 10A, 11A are spaced from each other by an integer n times the length λ (nλ) where λ denotes a measurement between two adjacent chain rollers, so that the subtractor 14A may accurately detect the release factors of the chain 2.

The subtractor 14A subtracts the output value of the amplifier 12A from the output value of the amplifier 13A, and the output value outputted from the subtractor 14A is converted into a digital value in the A/D converter 15A and 15 applied to the tension controller 20.

The tension controller 20 checks up the magnitude of the chain release in accordance with the digital signal applied thereto, and outputs a compensation signal for driving the electromagnets 18A, 19A in correspondence with the checked-up magnitude of the chain release. The compensation signal is converted to an analog signal in the D/A converter 16A and amplified in the amplifier 17A and then applied to the respective electromagnets 18A, 19A via the diodes D11, D12.

At this time, the driving signal applied to the electromagnet 18A denotes a signal of one polarity among the sinusoidal signal outputted from the power amplifier 17A, whereas the driving signal applied to the electromagnet 19A is a signal of an opposite polarity. Therefore, a repulsion force is applied to the electromagnet 18A, and an attraction force is applied to the electromagnet 19A, whereby the chain 2 is pulled inwardly and the tension of the upper span 2A of the chain 2 is maintained.

The release of the lower span 2B of the chain 2 follows the identical steps to those in the first tension control block 100B, and its description will be omitted accordingly.

Figure 5:
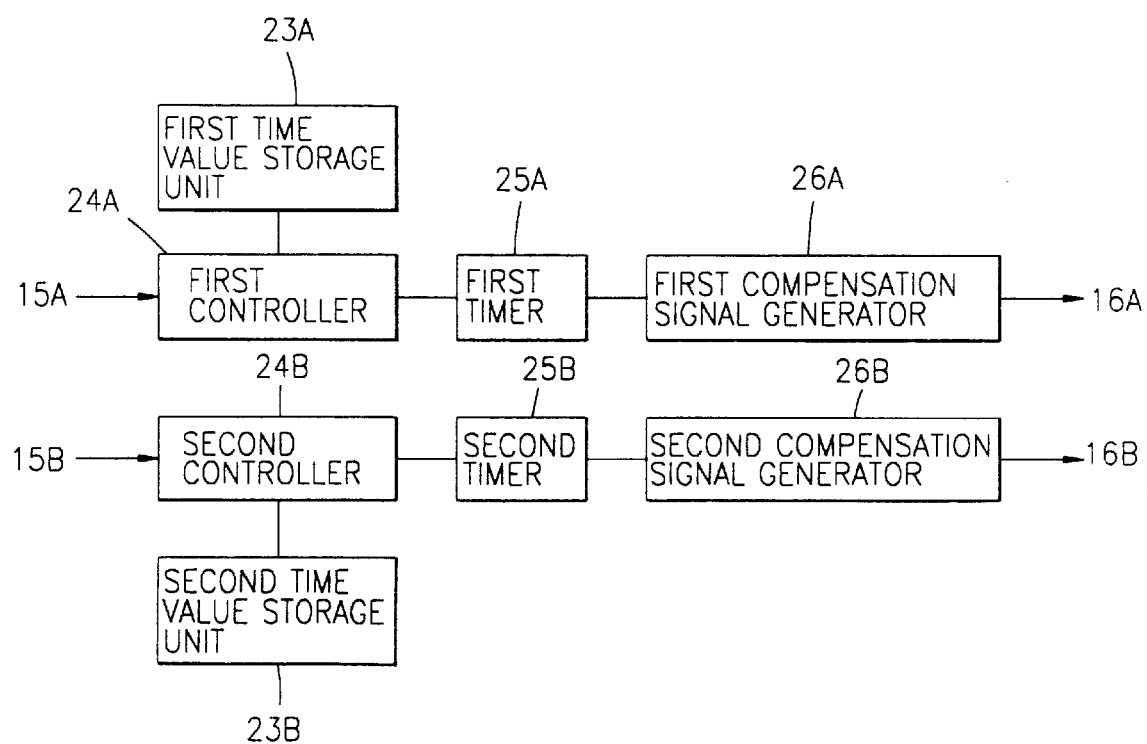
FIG. 5 is a block diagram illustrating a second example of a tension controller in the diagram of FIG. 3.

With reference to FIG. 5 illustrating the second example of the tension controller 20 according to the present invention, the tension controller 20 includes a first and second time value storage units 23A, 23B storing therein time values which serve to magnetize respective pairs of electromagnets (18A, 19A), (18B, 19B); a first and second controllers 24A, 24B for reading time values from the first and second time values storage units 23A, 23B so as to respond to the respective signals outputted from the A/D converters 15A, 15B; a first and second timers 25A, 25B for counting time values outputted from the first and second controllers 24A, 24B and outputting a turn-on signal during the counted time; and a first and second compensation signal generators 26A, 26B for outputting the first and second compensation signals when the turn-on signal is being applied thereto from the first and second timers 25A, 25B.

Figure 6:
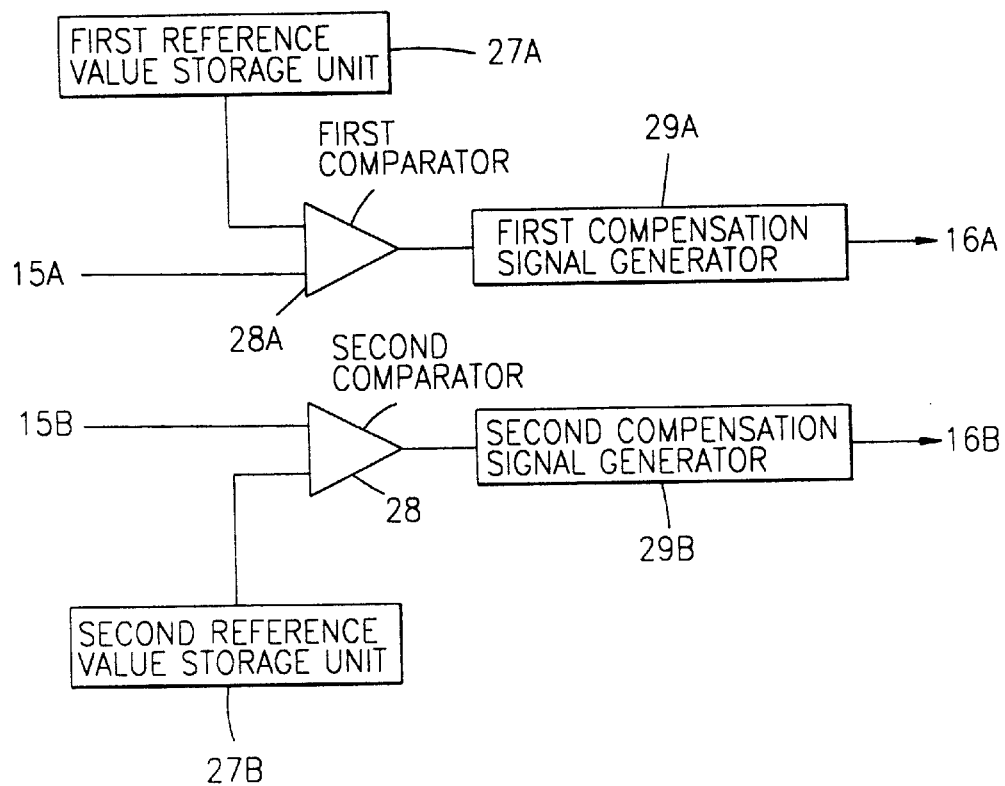
FIG. 6 is a block diagram illustrating a second example of a tension controller in the diagram of FIG. 3.

Also, as shown in FIG. 6 illustrating the third example of the tension controller 20 according to the present invention, the tension controller 20 includes: a first and second reference value storage unit 27A, 27B stored therein with respective upper limit values with regard to the upward chain release of the upper span 2A and the downward chain release of lower span 2B; comparators 28A, 28B for comparing respective output signals of the A/D converters 15A, 15B and reference values outputted from the first and second reference value storage units 27A, 27B, and outputting a turn-on signal if the output signals from the A/D converters 15A, 15B are larger than the reference values; and the first and second compensation signal generators 29A, 29B for outputting the first and second compensation signals when the turn-on signals are being applied thereto from the comparators 28A, 28B.

Figure 8:
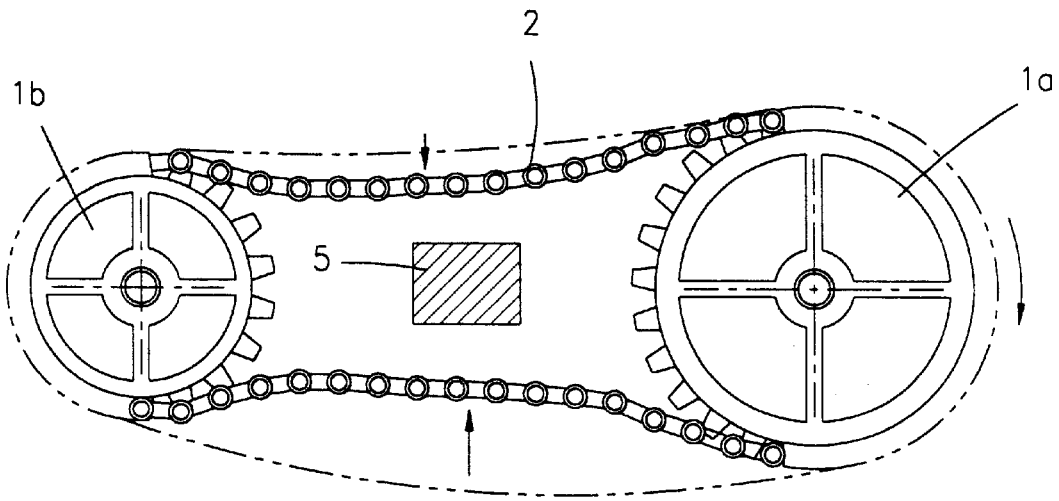
FIG. 8 is a side view illustrating a chain tension control apparatus in a chain-drive power transmission system according to a second embodiment of the present invention.
Figure 9:
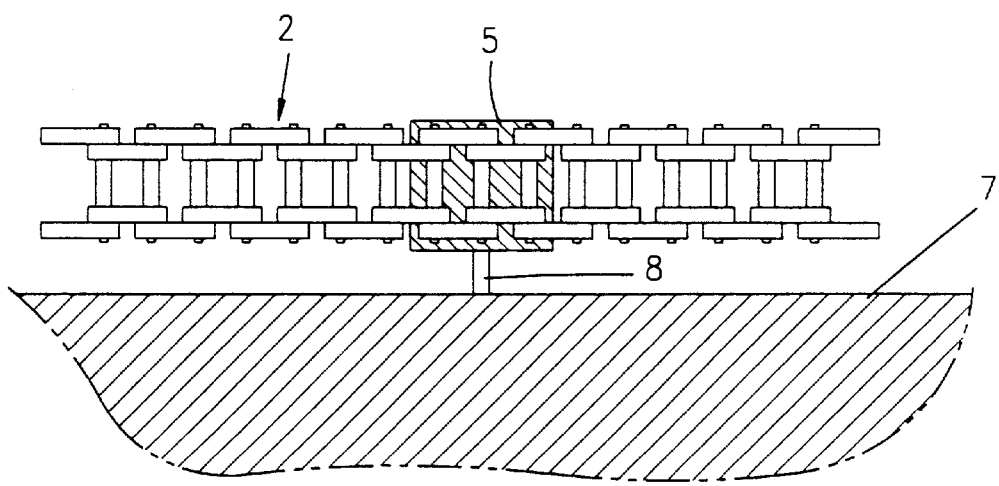
FIG. 9 is a partial plan view of a fixed electromagnet in the side view of FIG. 8.

As shown in FIG. 8 illustrating the chain tension control apparatus according to the second embodiment of the present invention and in FIG. 9, a permanent magnet 5 is fixed by a support 8 to an external frame 7 in order to maintain the tension of the chain 2 by a magnetic force from the magnet 5 to simultaneously function on the upper and lower spans 2A, 2B of the chain 2.

Figure 10:
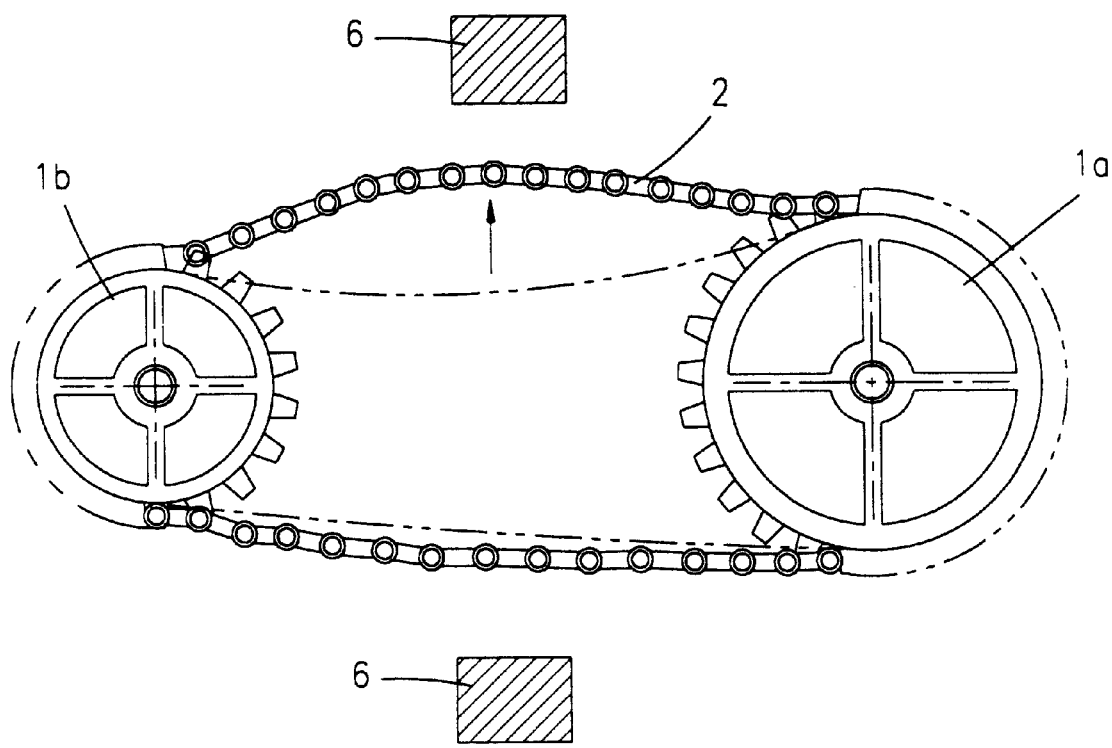
FIG. 10 is a side view illustrating a chain tension control apparatus in a chain-drive power transmission system according to a third embodiment of the present invention.

As shown in FIG. 10 illustrating the chain tension control apparatus for a chain-drive power transmission system according to the third embodiment of the present invention, a pair of permanent magnets 6 are respectively fixed on an external frame 7 in order to exert a magnetic force on the upper and lower spans 2A, 2B of the chain 2 for thereby maintaining the tension of the loosened chain 2.

As described above, the chain tension control apparatus for preventing a chain chattering in a chain-drive power transmission system according to the present invention prevents chain vibration and noise from occurring by maintaining the chain tension by use of non-contact electromagnets or permanent magnetics.

Further, the chain tension control apparatus for preventing a chain chattering in a chain-drive power transmission system according to the present invention maintains the chain tension by the magnetic force of electromagnets and permanent magnets which may be easily installed, for thereby obtaining a wear-proof property and a semi-permanent longevity thereof.

As the present invention may be embodied in several forms without departing from the spirit of essential characteristics thereof, it should also be understood that the present embodiment is not limited by any of the details of the foregoing description, unless otherwise specified, but rather be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. In a power transmission system including main and free wheeled subordinate sprockets and a chain formed of a plurality of links and rollers connected to each other, wherein said chain meshed to said main sprocket and said free wheeled subordinate sprocket transfers a rotation force of said main sprocket to said free wheeled subordinate sprocket, a chain tension control apparatus, comprising:

a first chain release detecting sensor disposed adjacent to a central upper portion of an upper span of said chain and detecting a release of the upper span of said chain;

a second chain release detecting sensor disposed adjacent to a central lower portion of a lower span of said chain and detecting a release of the lower span of said chain;

a tension controller comparing respective signal values outputted from said first and second chain release detecting sensors with a reference value, and outputting first and second compensation signals for compensating each release of the upper span and lower span of said chain;

a first electromagnet disposed adjacent to a central lower portion of the upper span of said chain, and downwardly attracting the upper span of said chain in accordance with said first compensation signal outputted from said tension controller; and a second electromagnet disposed adjacent to a central upper portion of the lower span of said chain, and upwardly attracting the lower span of said chain in accordance with said second compensation signal outputted from said tension controller.

2. In a power transmission system including main and free wheeled subordinate sprockets and a chain formed of a plurality of links and rollers connected to each other, wherein said chain meshed to said main sprocket and said free wheeled subordinate sprocket transfers a rotation force of said main sprocket to said free wheeled subordinate sprocket, a chain tension control apparatus, comprising:

a first chain release detecting sensor disposed adjacent to a central upper portion of an upper span of said chain and detecting a release of the upper span of said chain;

a second chain release detecting sensor disposed adjacent to a central lower portion of a lower span of said chain and detecting a release of the lower span of said chain;

first and second A/D (Analog/Digital) converters correspondingly converting respective signal values outputted from said first and second chain release detecting sensors to digital signal values;

a tension controller outputting first and second compensation signals for compensating a chain release of each of the upper and lower spans of said chain in correspondence with respective signal values outputted from said first and second A/D converters;

first and second D/A (Digital/Analog) converters correspondingly converting said first and second compensation signals outputted from said tension controller to analog signals;

first to fourth diodes rectifying positive and negative polarities of respective signal values outputted from said first and second D/A converters;

first and second electromagnets disposed adjacent to a central lower portion of the upper span and to a central upper portion of the lower span of said chain, and downwardly attracting the upper span of said chain in accordance with respective signal values outputted from said first and second diodes; and third and fourth electromagnets disposed adjacent to a central lower portion of the upper span and to a central upper portion of the lower span of said chain, and upwardly attracting the lower span of said chain in accordance with respective signal values outputted from said third and fourth diodes.

3. The chain tension control apparatus of claim 1, further comprising:

a third chain release detecting sensor disposed adjacent to an upper portion of the upper span of said chain at which said chain is meshed to said main sprocket and said free wheeled subordinate sprocket, and detecting a release of the upper span of said chain; and a fourth chain release detecting sensor disposed adjacent to an lower portion of the lower span of said chain at which said chain is meshed to said main sprocket and said free wheeled subordinate sprocket, and detecting a release of the lower span of said chain.

4. The chain tension control apparatus of claim 1 or 2, further comprising:

a first subtractor for subtracting an output signal of said third chain release detecting sensor from an output signal of said first chain release detecting sensor; and a second subtractor for subtracting an output signal of said fourth chain release detecting sensor from an output signal of said second chain release detecting sensor.

5. The chain tension control apparatus of claim 2, wherein said tension controller comprises:

a first compensation signal generator outputting a first compensation signal when the signal value outputted from said first A/D converter is being applied thereto; and a second compensation signal generator outputting a second compensation signal when the signal value outputted from said second A/D converter is being applied thereto.

6. The chain tension control apparatus of claim 2, wherein said tension controller comprises:

first and second time value storage units storing therein time values which serve to magnetize first to fourth pair of electromagnets;

first and second controllers for reading time values from said first and second time values storage units so as to respond to the respective signals outputted from said first and second A/D converters;

first and second timers for counting time values outputted from said first and second controllers and outputting a turn-on signal during the counted time; and first and second compensation signal generators for outputting first and second compensation signals when said turn-on signal is being applied thereto from said first and second timers.

7. The chain tension control apparatus of claim 2, wherein said tension controller comprises:

first and second reference value storage units stored therein by respective upper limit values with regard to respective upward and downward chain release values of the upper and lower spans of said chain;

first and second comparators for comparing respective output signals of said first and second A/D converters with reference values outputted from said first and second reference value storage units, and outputting turn-on signals when the signal values outputted from said first and second A/D converters are larger than said reference values; and first and second compensation signal generators for outputting first and second compensation signals when the turn-on signals are being applied thereto from said first and second comparators.

8. The chain tension control apparatus of claim 2, wherein said first and second chain release detecting sensors are spaced from each other by an integer n times a length $\lambda$ ($n\lambda$) where $\lambda$ denotes a measurement between two adjacent chain rollers.

* * * * *